United States Patent [19]
Drew et al.

[11] 3,721,408
[45] March 20, 1973

[54] VARIABLE MODE SLING FOR HELICOPTER RECOVERY SYSTEMS

[75] Inventors: Gene R. Drew, El Centro, Calif.; Bobby C. Layman, Dahlgren, Va.

[73] Assignee: The United States of America as represented by the Secretary of the Navy

[22] Filed: Nov. 19, 1971

[21] Appl. No.: 200,387

[52] U.S. Cl. ................................................244/139
[51] Int. Cl. ............................................B64d 17/38
[58] Field of Search....................244/139, 140, 138

[56] References Cited

UNITED STATES PATENTS 2,478,758  8/1949  Frieder et al...........................244/139
3,669,388  10/1969  Kreuninjen........................244/138 R

*Primary Examiner*—Milton Buchler
*Assistant Examiner*—Carl A. Rutledge
*Attorney*—R. S. Sciascia et al.

[57] ABSTRACT

A sling design for recovery of airborne loads, such as helicopters disabled in flight, having a variably geometry automatically programmed so that if recovery is necessary when the aircraft is disabled at high speed the sling geometry is selected to reduce the trim angle and avoid excessive pitching, and when the helicopter speed is sufficiently retarded the sling geometry is changed to a low speed configuration. In a final mode, as soon as the recovered helicopter makes contact with the ground the entire sling apparatus is automatically jettisoned.

7 Claims, 5 Drawing Figures

INVENTOR.
GENE R. DREW
BY  BOBBY LAYMAN

VARIABLE MODE SLING FOR HELICOPTER RECOVERY SYSTEMS

CROSS-REFERENCES TO RELATED APPLICATIONS

This invention can be used in conjunction with a "Load Equalizing Sling" Ser. No. 191,277 filed on Oct. 21, 1971 by Gene R. Drew.

BACKGROUND OF THE INVENTION

This invention relates to sling apparatus, designed primarily for recovery of disabled helicopters, but it is understood that it can be used for any purposes for which it is found applicable.

The conventional ballistic escape systems for pilots in conventional aircraft has not been applicable to helicopters because of the presence of the large rotary blades. Accordingly, one prior art system proposes to deploy a cluster of parachutes from the fuselage after the rotating blades have been severed and jettisoned. As one might expect, suspending an aircraft in this manner by a sling, presents a plurality of unique stability problems. One of these problems relate to the excessive shock forces that may be concentrated on a single leg of the forward sling creating a structural problem. This problem has been solved by using the equalizing sling apparatus described in the aforementioned copending patent application which can be used in conjunction with the present invention. Another stability problem concerns the tendency of a helicopter disabled at high speed to have a severe pitching moment when the recovery parachutes are first deployed. This condition arises because the disabled helicopter continues in the direction of flight while the deployed parachutes are dragged to a position aft of the helicopter. This causes most, if not all, of the parachute force to be transmitted to the forward sling. Since this force is applied to the helicopter substantially forward of its center of gravity, an unbalanced moment force will be set up which will cause excessive fuselage rotation about the pitch axis possibly resulting in fuselage inversion.

The present invention provides a multi-mode sling capable of being oriented to handle the disabled aircraft at high velocity to avoid excessive pitching, and the sling geometry changed to accommodate a low speed recovery.

SUMMARY OF THE INVENTION

A sling apparatus for helicopter recovery is capable of a multiple mode operation; namely, when the helicopter is disabled at high speeds or at low speeds, as well as jettisoning of the recovery apparatus when the helicopter makes ground contact. This result is achieved by designing the sling with a variable geometry the mode of which can be automatically selected when the helicopter is at predetermined speeds. The variable geometry ensures that the parachute forces will pass through the center of gravity in either mode of operation.

The sling is designed with a forward sling and an aft sling, each sling having a pair of leg sections the lower ends of which are anchored to opposite sides of the helicopter fuselage. The legs of the aft sling each have a releasable intermediate connection means whereby their length can be temporarily foreshortened. Means are provided for automatically controlling the release of said connections means including a velocity sensor, an electro-ballistic programmer, and individual shaped explosive charge electrically connected to the programmer and positioned adjacent all the sling connection points.

At high velocity recoveries, the velocity sensor and programmer permit the aft sling legs to remain in their foreshortened condition to ensure that the parachute forces pass through the helicopter fuselage close to the center of gravity to avoid any severe pitching moments. When the helicopter velocity reaches a lower predetermined level, the foreshortened legs are released to permit them to assume their normal length thus changing the sling geometry so that the parachute force will continue to pass through the center of gravity of the fuselage. When the suspended fuselage is lowered to the point of contacting the ground, the impact is programmed to cut all sling connections to the fuselage for jettisoning the recovery system, for the same purpose that a parachutist discards his parachute upon landing.

STATEMENT OF THE OBJECTS OF INVENTION

A principal purpose of the invention is to provide a sling apparatus capable of changing its geometry to enable the load force to be applied to the object being recovered close to its center of gravity in either of several modes of recovery operation.

Another important purpose of the invention is to provide a helicopter recovery system having a system that automatically will control the sling geometry depending on the speed of the helicopter at the time of recovery.

Still another important object of the invention is to provide means for severing the recovery system from the helicopter upon landing.

Other objects, advantages and novel features of the invention will become apparent from the following detailed description of the invention when considered in conjunction with the accompanying drawings.

DESCRIPTION OF THE PREFERRED EMBODIMENTS

Figure 1:
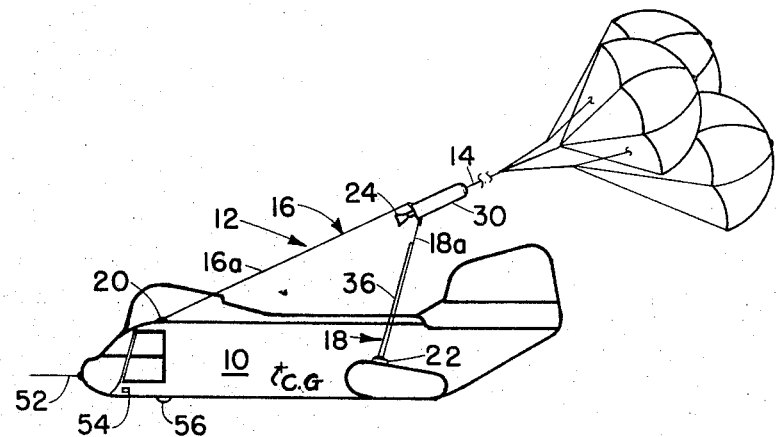
FIG. 1 is a side elevation of the invention recovery sling shown attached to a disabled helicopter in a high speed parachute recovery mode.
Figure 2:
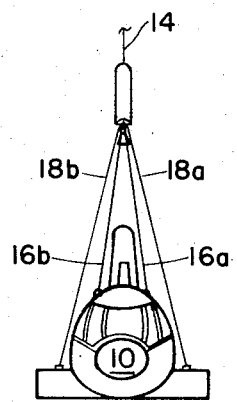
FIG. 2 is a front elevation view of FIG. 1.

Referring to the drawing where like reference numerals refer to similar parts throughout the figures there is shown in FIG. 1 a load, such as disabled helicopter 13, being suspended by a novel sling 12 connected by a riser line 14 to a cluster of parachutes (not shown).

Sling 12 comprises a pair of forward and aft slings 16 and 18, each having two leg sections 16a, 16b and 18a, 18b, respectively, attached at their lower looped ends to the fuselage by brackets 20 and 22. The upper ends of the four sling legs may be secured to riser 14 via a load bearing device 24, the details of which form the invention in the aforementioned patent application, although any other load bearing device can be employed without detracting from the present invention. Following the teaching of the aforementioned invention, the legs 16a and 16b are made of a continuous length of line reeved and readily movable through a pulley 26 pinned to the load bearing device 24. Since the forward sling legs carry substantially all of the opening parachute forces any yawing motion of the helicopter during recovery will cause the forces between the forward legs to be equally distributed even if their relative lengths vary during such jarring movement.

As the aft sling carries little, if any, of the parachute opening forces, its legs 18a and 18b need not be constructed to be adjustable in length and, therefore, they each understandably may be pinned at 28 to the load bearing device. A retro-rocket 30 may be mounted between the load bearing device and the riser line 14 to assist in the recovery of large helicopters.

Figure 3:
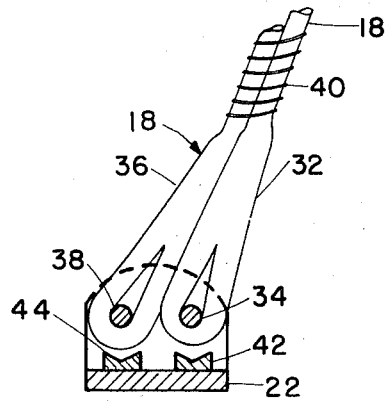
FIG. 3 is an enlarged side elevation view of a forward fuselage connection for forward sling legs.

The novel sling 12 which forms the subject matter of the instant invention resides primarily in its dual mode capability of handling the recovery of helicopters in flight at either high speeds or low speeds. For purposes of illustration, for a medium or large helicopter such as a CH 46 low speed is any speed from a hover to 85 knots, and high speed is considered any speed above 85 knots. This is accomplished by fabricating each of aft sling legs 18a and 18b of a variable length. As shown in FIGS. 1 and 3, one construction that can be employed, as illustrated, for example by leg 18a, provides an intermediate loop 32 which is pinned at 34 to aft fuselage bracket 22 adjacent to its bottom loop 36 which is also pinned at 38 to bracket 22. Thus, each leg of the rear sling is provided with an intermediate loop 32 and a bottom loop 36, and in the high speed mode illustrated in FIG. 1 the load on rear sling 18a is carried by both loops. The excess line material of leg 18a between loops 32 and 36 is doubled on itself and temporarily tied to leg 18a by a stowage tie 40 (FIG. 3). Shaped explosive charges 42 and 44 are supported on bracket 20 immediately adjacent to the ends loops 34 and 38, respectively to cut the respective loops under selected conditions that will be described later.

Figure 4:
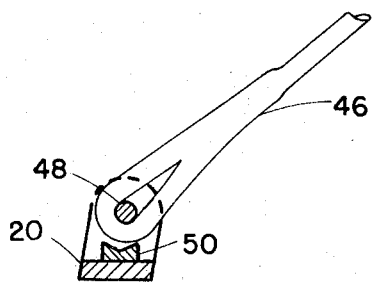
FIG. 4 is an enlarged side elevation view of the aft fuselage connection for the lower rear sling legs.

Front sling legs 16a and 16b each have a bottom loop 46 secured by a pin 48 to forward fuselage bracket 20, as shown in FIG. 4. A shaped charge 50 is likewise supported on bracket 20 for a similar purpose as is performed by charge 44.

The multi-mode operation of the invention sling is controlled by a velocity sensor, i.e., standard pitot tube 52 projecting from the helicopter nose and connected to an electro-ballistic programmer 54 mounted in the fuselage, which in turn is connected by electrical lines, not shown, to each of the individual shaped charges 42, 44 and 50. This control system automatically selects the sling geometry for the high speed mode or low speed mode operation of the sling depending on the velocity of the helicopter at the time of disablement.

OPERATION

Figure 5:
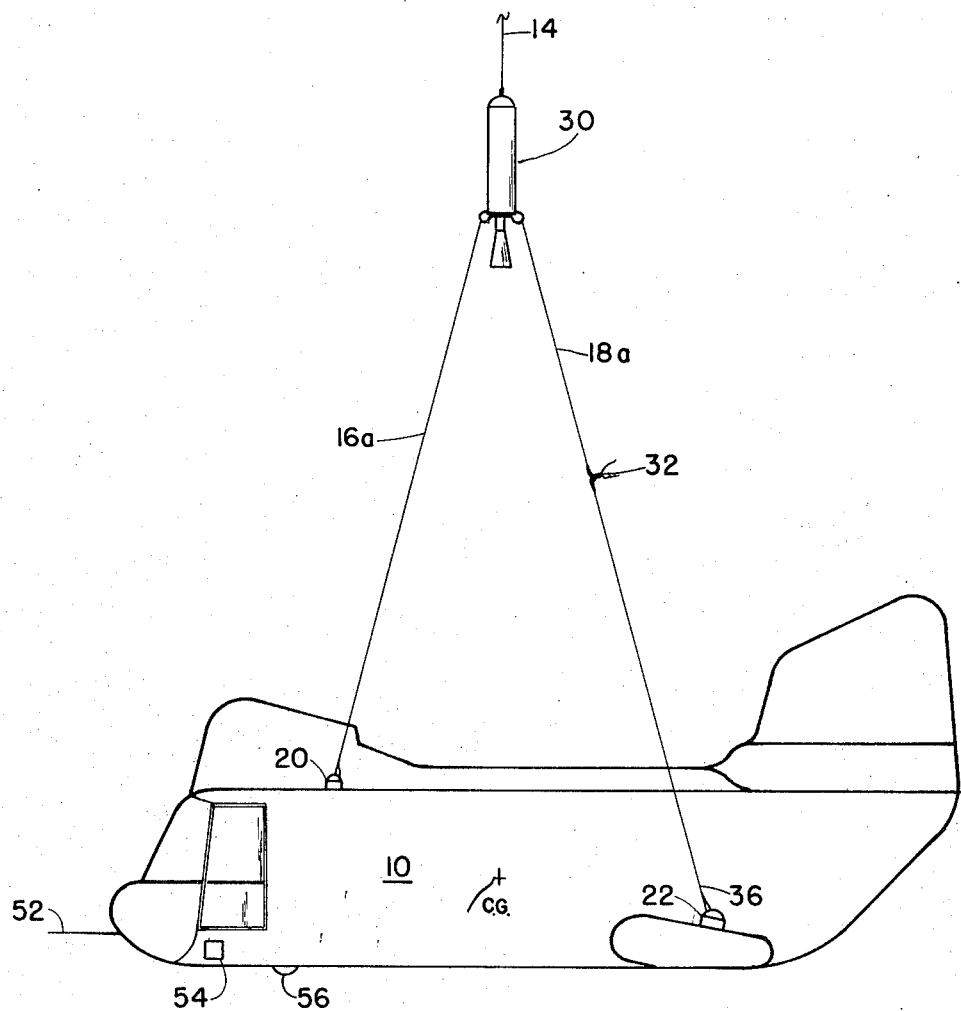
FIG. 5 is a side elevation of the invention sling similar to FIG. 1 in a low speed parachute recovery mode.

The following operation modes are described after the main helicopter blades have been severed prior to deployment of the parachute recovery system in a conventional manner not forming a part of this invention. If the helicopter is disabled in flight while traveling at high speeds, i.e., 85 knots and above, the speed is sensed by velocity sensor 52 and through programmer 54 the sling is maintained in the condition as shown in FIG. 1. In this high speed mode, aft sling legs 18a and 18b are foreshortened so that the parachute opening force in riser 14 is vectored very nearly through the center of gravity of the helicopter fuselage to reduce any excessive upward pitching of the fuselage thereabout, as would occur if the sling legs were of similar lengths. After lapse of a short interval of time, the forward velocity of the helicopter will have substantially decayed and the drag force will be materially reduced. When this pre-programmed condition is reached, programmer 54 will cause shaped explosive charges 42 to sever intermediate loops 32. Since loops 32 are not longer restrained by pins 34, the rear sling legs 18a and 18b will load the stowage ties 40 causing them to fail sequentially and allowing the rear sling legs to assume their full length, low speed mode, as shown in FIG. 5. In this condition the parachute cluster is substantially overhead, riser 14 extends vertically, and the normal parachute force passes through the helicopter center of gravity to maintain zero trim angle.

Should helicopter 10 be disabled at low speeds, i.e., below 85 knots velocity sensor 52 and programmer 54 automatically will operate to allow the sling to assume the low speed attitude as illustrated in FIG. 5. In other words, loop 32 is severed by shaped charge 42 prior to parachute deployment so that when parachute recovery system 12 is extended the sling automatically will assume the configuration of FIG. 5. Retro-rocket 30 can be initiated through programmer 54 whenever the load requires additional lift assistance to the parachute cluster.

When the descending helicopter contacts the ground, impact switch 56 is actuated and through programmer 54 remaining shaped charges 44 and 50 are initiated which in turn cut respective sling loops 36 and 46. The parachutes, retro-rocket 30 and associated sling 12 is now disconnected from the helicopter and free to be jettisoned to avoid possible inversion of the recovered helicopter on the ground and injury to the occupants and/or damage to the helicopter.

The novel sling apparatus provides a means for safe and reliable recovery of large helicopters disabled in flight and of its occupants. By having a multiple mode capability, the sling in a high speed recovery mode can be controlled to prevent excessive upward pitching. When the helicopter reaches a predetermined lower speed the sling geometry is changed to its normal orientations. If the helicopter is disabled at a low speed, the sling geometry is changed before parachute deployment. The selection of the sling mode is accomplished automatically by a circuit including a conventional velocity sensing device including a programmer. In a final recovery mode, the entire sling apparatus automatically is cut free of the helicopter as soon as it engages the ground.

What is claimed is:

1. Multiple mode sling apparatus for parachute recovery of disabled helicopters comprising:
   a pair of forward and aft slings, each sling having two leg sections;
   means on both sides of the fuselage for attaching the lower end of each leg section;
   means for releasably foreshortening the legs sections of said aft sling to provide a high speed recovery mode;
   means for releasing the aft leg sections to assume their normal length to provide a low speed recovery mode;
   and a system for automatically controlling the releasing means depending on the velocity of the helicopter at the time of recovery;
   whereby the sling geometry can be selected to vector the parachute force to pass close to the center of gravity of said fuselage at either high speed or low speed recovery modes to reduce excessive pitching of the helicopter.

2. The apparatus of claim 1 wherein the aft leg sections are provided with an intermediate connection means for securing to the fuselage attachment means.

3. The apparatus of claim 2 wherein the intermediate connection is releasable from the fuselage attachment means by explosive means.

4. The apparatus of claim 1 wherein the means for attaching the lower end of each leg section to the fuselage is releasable to enable the sling apparatus to be jettisoned automatically upon contact of the helicopter with the ground.

5. The apparatus of claim 4 wherein a ground contact switch is provided to initiate the release of the attaching means.

6. The apparatus of claim 1 wherein the lower end of each leg section has a loop portion which is secured to the fuselage attaching means by an explosive bolt.

7. The apparatus of claim 1 wherein the control system includes a velocity sensor and a programmer for preselecting the sling geometry.

* * * * *